United States Patent
Zimmerman et al.

(10) Patent No.: US 7,023,381 B2
(45) Date of Patent: Apr. 4, 2006

(54) MULTI-FREQUENCY PSEUDOLITES FOR CARRIER-BASED DIFFERENTIAL-POSITION DETERMINATION

(75) Inventors: Kurt R. Zimmerman, Mountain View, CA (US); Clark E. Cohen, Palo Alto, CA (US); David G. Lawrence, Mountain View, CA (US); Walter C. Melton, Los Altos, CA (US); Henry Stewart Cobb, Mountain View, CA (US); Paul Yalden Montgomery, Menlo Park, CA (US)

(73) Assignee: Novariant, Inc., Menlo Park, CA (US)

(*) Notice: Subject to any disclaimer, the term of this patent is extended or adjusted under 35 U.S.C. 154(b) by 190 days.

(21) Appl. No.: 10/391,161

(22) Filed: Mar. 17, 2003

(65) Prior Publication Data

US 2004/0021603 A1 Feb. 5, 2004

Related U.S. Application Data

(63) Continuation of application No. 09/769,823, filed on Jan. 24, 2001, now abandoned.
(60) Provisional application No. 60/178,011, filed on Jan. 24, 2000, provisional application No. 60/213,738, filed on Jun. 22, 2000, and provisional application No. 60/233,969, filed on Sep. 20, 2000.

(51) Int. Cl.
*G01S 1/08* (2006.01)
*G01S 3/02* (2006.01)

(52) U.S. Cl. ........................................ 342/386; 342/464
(58) Field of Classification Search ................. 342/458, 342/385, 386, 464
See application file for complete search history.

(56) References Cited

U.S. PATENT DOCUMENTS

| | | | | |
|---|---|---|---|---|
| 4,283,726 A | * | 8/1981 | Spence et al. ............... | 342/458 |
| 5,736,961 A | * | 4/1998 | Fenton et al. ............ | 342/357.04 |
| 6,101,178 A | * | 8/2000 | Beal ............................. | 370/336 |
| 6,160,837 A | * | 12/2000 | Bruno et al. .................. | 375/130 |
| 6,239,743 B1 | * | 5/2001 | Lennen .................... | 342/357.12 |
| 6,266,009 B1 | * | 7/2001 | Hwang ................... | 342/357.12 |
| 6,271,788 B1 | * | 8/2001 | Longaker et al. ....... | 342/357.03 |

FOREIGN PATENT DOCUMENTS

WO   WO 99/63358 A1 * 12/1999

OTHER PUBLICATIONS

Forssell, B. "Comparison of wide-laning and tone-ranging," Electronics Letters, vol. 33, No. 18, Aug. 1997, pp. 1525–1526.*

Stone, Jonathan M. et al, "GPS Pseudolite Transceivers and their Applications," presented at the ION National Technical Meeting 99, San Diego, California, Jan. 1999.*

* cited by examiner

*Primary Examiner*—Gregory C. Issing
(74) *Attorney, Agent, or Firm*—Brinks Hofer Gilson & Lione

(57) ABSTRACT

Apparatus and methods for resolving integer ambiguities in position determination. An embodiment of the invention includes a reference system, augmented with multi-frequency pseudolites using a carrier phase differential GPS implementation, and a mobile system. In one embodiment, the components of the reference system includes one or more multi-frequency pseudolites, one or more multi-frequency reference receivers, a data link standing alone or built into the pseudolites, and the associated antennae for each of these elements. The components of the reference system may be stationary. The mobile system may include a multi-frequency receiver and its associated antennae. Because the mobile systems may passively receive information, an unlimited number of mobile systems may be included in any given embodiment of the invention. A multi-frequency pseudolite uses a single frequency source to synthesize all of the multiple carrier frequencies and all of the multiple base band signals modulated onto carrier frequencies for transmission.

3 Claims, 8 Drawing Sheets

MULTI-FREQUENCY PSEUDOLITES FOR CARRIER-BASED DIFFERENTIAL-POSITION DETERMINATION

This application is a continuation of U.S. patent application Ser. No. 09/769,823, entitled, "Multi-Frequency Pseudolites Carrier-Based Differential-Position Determination", filed Jan. 24, 2001, now abandoned, naming Kurt R. Zimmerman et al. as inventors, which claims the benefit of the following applications:

U.S. Provisional Patent Application No. 60/178,011, entitled, "GPS Performance in Deep Open Pit Mines using Pseudolites," filed Jan. 24, 2000, naming Clark E. Cohen et al. as inventors, and under an obligation of assignment to IntegriNautics Corp. of Menlo Park, Calif.;

U.S. Provisional Patent Application No. 60/213,738, entitled, "Open-pit Mining Using Pseudolites," filed Jun. 22, 2000, naming Clark E. Cohen et al. as inventors, and under an obligation of assignment to IntegriNautics Corp. of Menlo Park, Calif.; and U.S. Provisional Patent Application No. 60/233,969, entitled, "Multi-frequency Pseudolites for Instantaneous Carrier-Ambiguity Resolution," filed Sep. 20, 2000, naming Clark E. Cohen et al. as inventors, and under an obligation of assignment to IntegriNautics Corp. of Menlo Park, Calif.

U.S. patent application Ser. No. 09/769,823 and U.S. Provisional Patent Applications Nos. 60/178,011, 60/213,738 and 60/233,969 are incorporated by reference herein.

RELATED APPLICATIONS

The following application relates to this invention:

U.S. Re-Issue Patent Application No. 09/187,194, entitled, "System and Method for Generating Precise Position Determinations," filed Nov. 5, 1998, naming Clark E. Cohen et al. as inventors, and assigned to IntegriNautics Corp. of Menlo Park, Calif.

The present invention relates generally to positioning systems for vehicles. It relates specifically to precisely determining positions for any land, sea, air, or space vehicle where existing satellite navigation methods such as GPS are inadequate due to limited visibility of its satellites.

BACKGROUND

Global positioning system (GPS) satellites transmit two coherent signals at different frequencies generated from a common time and frequency source. A receiver demodulates these signals to recover the underlying carrier frequency signal. The coherency of the two carriers facilitates the recovery of integer wavelength ambiguities in applications using carrier-based differential techniques. Many land applications of GPS (survey, ionospheric research, geophysical surface motion monitoring, etc.) use this technique. Typically, some residual ambiguity results from using the two coherent signals to resolve the integer wavelength ambiguities, and other methods are necessary to accelerate and/or confirm the accuracy of the ambiguity resolution results.

In a number of applications of carrier-based differential GPS (aircraft automatic landing and open-pit mine equipment positioning, for example), pseudolites augment the GPS satellite signals. In the landing application, the pseudolites facilitate the integer wavelength ambiguity resolution by incorporating the rapid geometry change due to the motion of the airplane close to the nearby pseudolites into the solution for the integer ambiguities. Cohen at al., U.S. Pat. No. 5,572,218, describes such an application.

In the open-pit mining application, for example, pseudolites augment the satellites obscured from view by high mine walls and cliffs. Single-frequency pseudolites used in this fashion provide additional code-phase measurements, but they do not aid in rapidly resolving carrier cycle ambiguities: The motion of the vehicles (shovels, trucks, crawlers, etc.) does not provide large geometry changes with respect to the pseudolites in a short period.

Accordingly, an object of this invention is to rapidly resolve integer ambiguity—even without significant vehicle motion relative to the pseudolites.

Another object of the invention is to enhance the integrity and speed of the pseudolite technique described above.

Still another object of the invention is to leverage conventional GPS equipment, including GPS receivers and pseudolites, to reduce the cost of a system.

These and other goals of the invention will be readily apparent to one of skill in the art on reading the background above and the description below.

SUMMARY

Herein are described apparatus and methods for rapidly resolving integer ambiguities in position determination. An embodiment of the invention includes a reference system, augmented with multi-frequency pseudolites using a carrier phase differential GPS implementation, and a mobile system.

In one embodiment, the reference system may include one or more multi-frequency pseudolites, one or more multi-frequency reference receivers, a data link that is either stand-alone or built in to the pseudolites, and the associated antennae for each of these elements. The components of the reference system may be stationary.

The mobile system may include a multi-frequency receiver and its associated antennae. Because the mobile systems may passively receive information, an unlimited number of mobile systems may be included in any given embodiment of the invention.

A multi-frequency pseudolite uses a single frequency source to synthesize all of the multiple carrier frequencies and all of the multiple base band signals modulated onto carrier frequencies for transmission. The relative timing of all of the carriers and base band signals is constant and stable so no unknown timing drift exists between any of these signals.

In a preferred embodiment, the modulation is a bi-phase pseudo random noise (PRN) sequence from the same family of Gold Codes used by the GPS satellites and the same code is used for all of the several carrier frequencies for any particular pseudolite. Different codes are used for the different pseudolites. The modulation timing is continuous for each pseudolite but the actual transmission of the modulated signals is pulsed to so that the pseudolites do not interfere with each other at the various system receivers.

In the preferred embodiment, the multi-frequency pseudolite includes a multi-frequency reference receiver for synchronizing the transmitted pseudolite signals with the GPS system. This establishes coordination between all of the pseudolites in a given local implementation so that they can all be programmed to not overlap their pulsed transmissions. The integrated GPS receiver also surveys the location of the multi-frequency pseudolites.

In the preferred embodiment wherein each pseudolite is joined with a multi-frequency reference receiver, the receiver phase tracks all available GPS satellite signals and its associated pseudolite signal and sends that data over the pseudolite's ranging signal. The mobile receiver then acquires this data directly from the RF ranging signals, similar to the way GPS sends satellite information at 50 baud as is known in the art. In other embodiments, where the multi-frequency reference receiver is independent of the pseudolites, the receiver not only phase tracks all available GPS satellites but all available multi-frequency pseudolites as well. The data in this case is relayed to the mobile receivers via a separate radio communication link.

In one embodiment, the mobile receivers have functionally equivalent hardware and software as the reference receivers. They also receive through their associated antennae, to the extent possible, all of the same pseudolite and GPS satellite signals received by the reference receivers but limited by line-of-sight restrictions due to surrounding obstacles. They also have software for assimilating the reference receiver phase information received over the data link from the reference receiver. The mobile receiver software combines the relative phase information for all of the pseudolite and GPS satellite signals it has itself measured with the relative phase information for all of the pseudolites and GPS satellites that it has received over the data link from the reference receiver to then determine the wavelength integer ambiguities, thereby computing its position relative to the reference receiver position to an accuracy with errors on the order of only a fraction of a wave length at the L1 (1575.42 MHz) frequency. In most instances, the receiver may confirm, supplement, or substitute those calculations with additional calculations accurate to a fraction of a wavelength at each of the other multiple frequencies received at the mobile receiver. By using the multiple frequencies from the several pseudolites in view, the resolution of the wavelength integer ambiguities is nearly instantaneous (within one measurement cycle, typically 0.1 seconds or less) because it does not require a geometry change to accumulate due to either mobile receiver or GPS satellite motion to resolve the ambiguities.

DESCRIPTION OF SPECIFIC EMBODIMENTS

System Configuration

Figure 1:
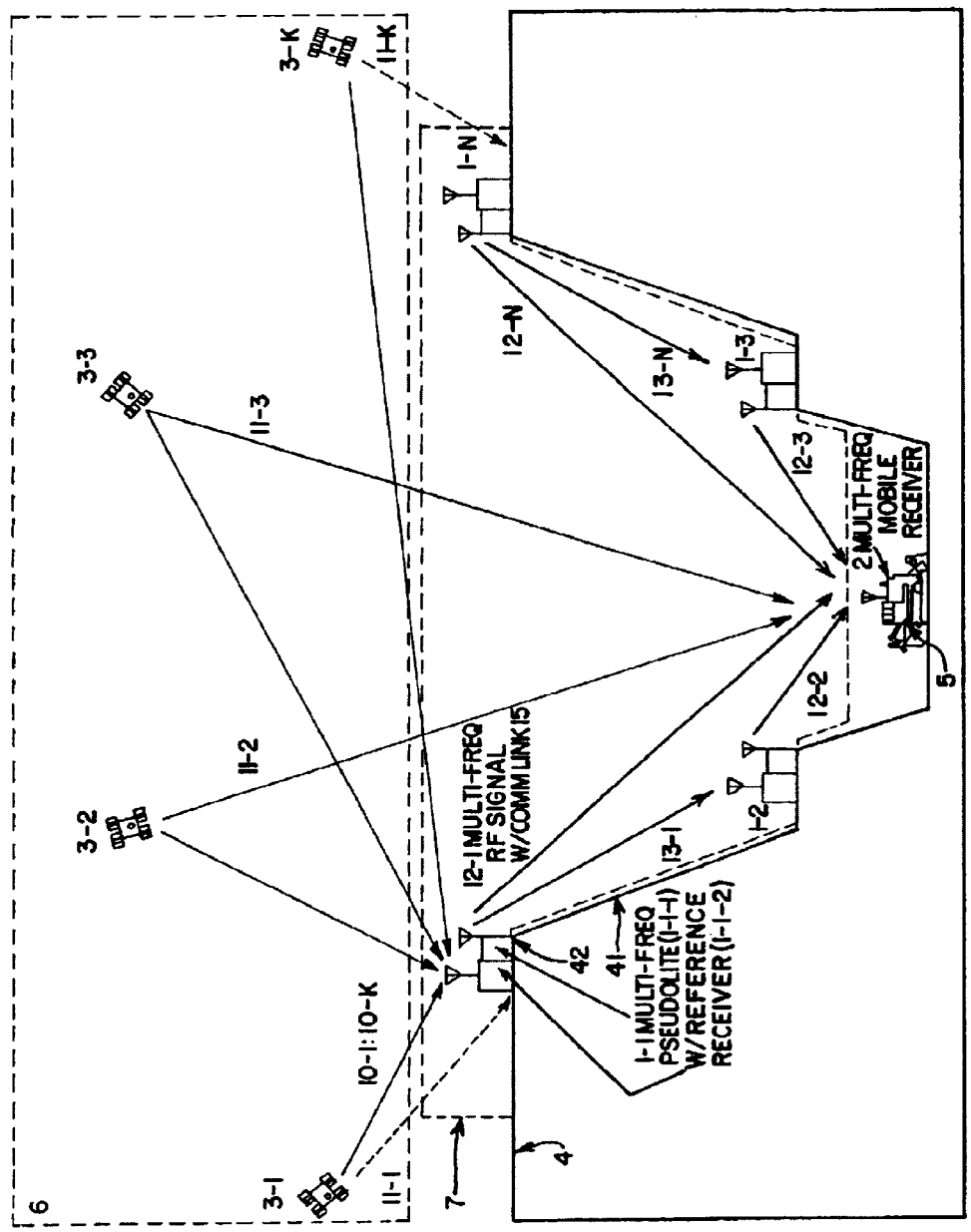
FIG. 1 illustrates an open-pit mine incorporating an embodiment of the invention.

FIG. 1 illustrates an open-pit mine incorporating an embodiment of the invention. The mining application may include a pit 4, a mining vehicle 5, a global navigation satellite system 6 of the art and a multi-frequency pseudolite system 7.

The pit 4 has walls 41 and a rim 42.

The mining vehicle 5 includes a MFPS receiver 2. An MFPS receiver 2 recognizes and uses signals from the MFPS 7. Anything using a MFPS receiver 2 is a "user" of the MFPS 7, as the term is used herein. Typically, a user carries a multi-frequency mobile receiver 2 to determine its position.

The multi-frequency pseudolite system 7 may include multi-frequency pseudolites 1-1:1-N, where N is the number of pseudolites. The pseudolites may be to ensure that four or more pseudolites 1-$i$ ($i<=N$) are available and provide good geometric dilution of precision (a factor of 15 or less, preferably less than 5) to a user in the work space below— around the rim 42, for example.

Where no satellites are visible to a user, the invention may operate using only pseudolite signals, as described herein.

The satellites 3-1:3-K of any available global navigation satellite system (GNSS) may be incorporated. GPS is the most likely, but GLONASS may be included, as well as any future such systems. The satellites 3-1:3-K of the GNSS system 6 may respectively broadcast signals 10-1:10-K and 11-1:11-K. The signals 10-1:10-K travel along a straight line towards a pseudolite 1-$i$ of the pseudolite system 7 while the signals 11-1:11-K travel along a straight line towards a vehicle MFPS receiver 2.

The surrounding terrain 41 may block some portion of the GNSS signals 11-1:11-K, creating the need for the pseudolites. The mobile receiver 2 may use the remaining portion of the GPS signals 11-1:11-K to improve the ultimate position solution.

Another portion of the GNSS signals 10-1:10-K may be used to survey the locations of the highest-elevation pseudolites 1-$j$ and to synchronize the system. Lower-elevation pseudolites (pseudolites 1-2 and 1-3, for example) may need signals from upper-elevation pseudolites (pseudolites 1-1 and 1-N, for example) for survey and synchronization purposes.

A Multi-frequency Pseudolite

Figure 4:
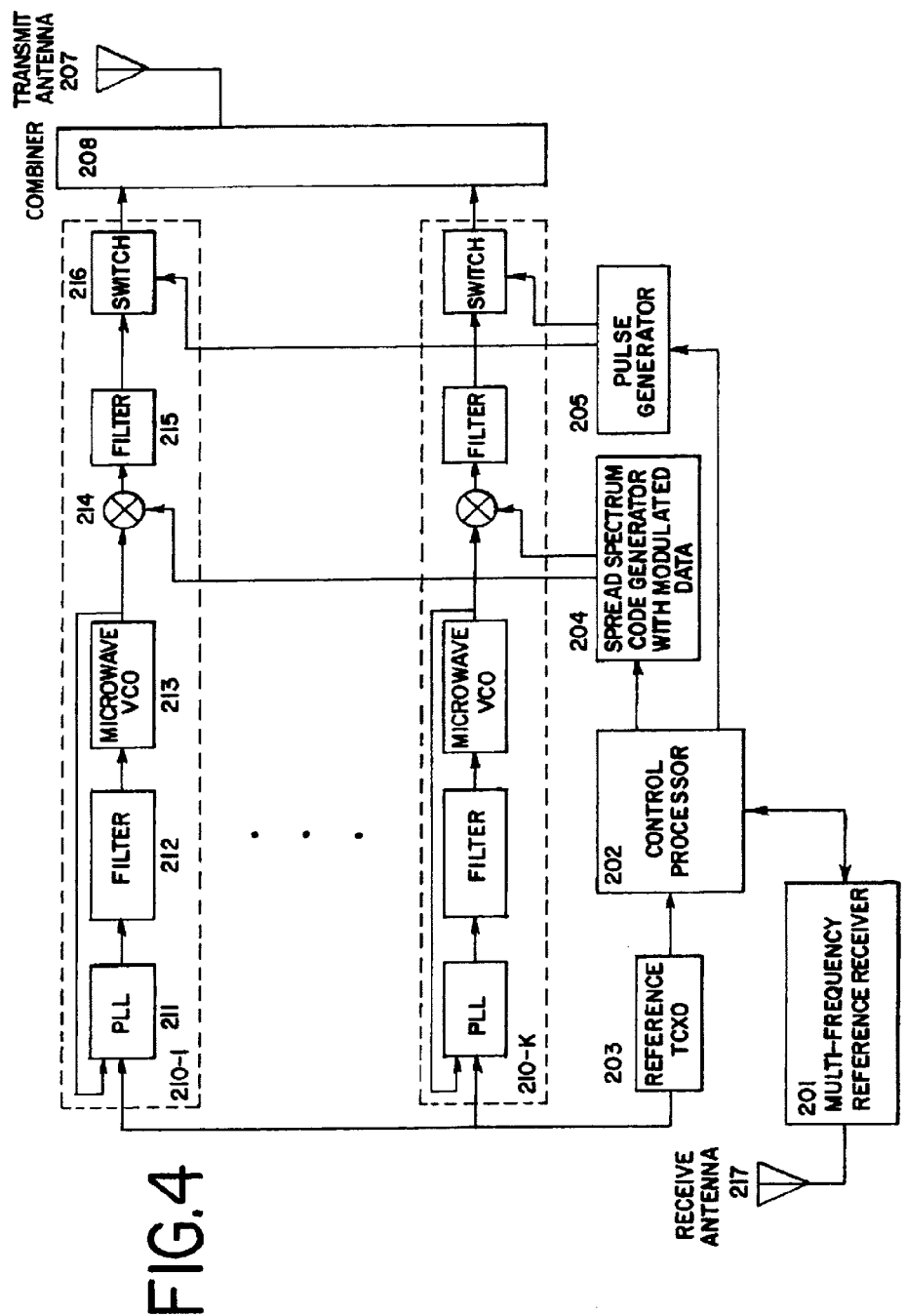
FIG. 4 illustrates a multi-frequency pseudolite according to one embodiment of the invention.

FIG. 4 illustrates a multi-frequency pseudolite 1-$i$ according to one embodiment of the invention. A multi-frequency pseudolite 1-$i$ may include a receive antenna 217, a multi-frequency reference receiver 201, a control processor 202, a reference oscillator 203, a code generator 204, a pulse generator 205, multiple signal generators 210, a combiner 208 and a transmit antenna 207. These components may be interconnected as illustrated and as described herein.

The signal generators 210 may produce GNSS-like radio-frequency (RF) signals for the pseudolite 1-$i$ to broadcast.

The signal generators 210 in the pseudolite 1-$i$ may be any number. To operate in license-free RF spectrum bands currently available, the number may be four.

Figure 7:
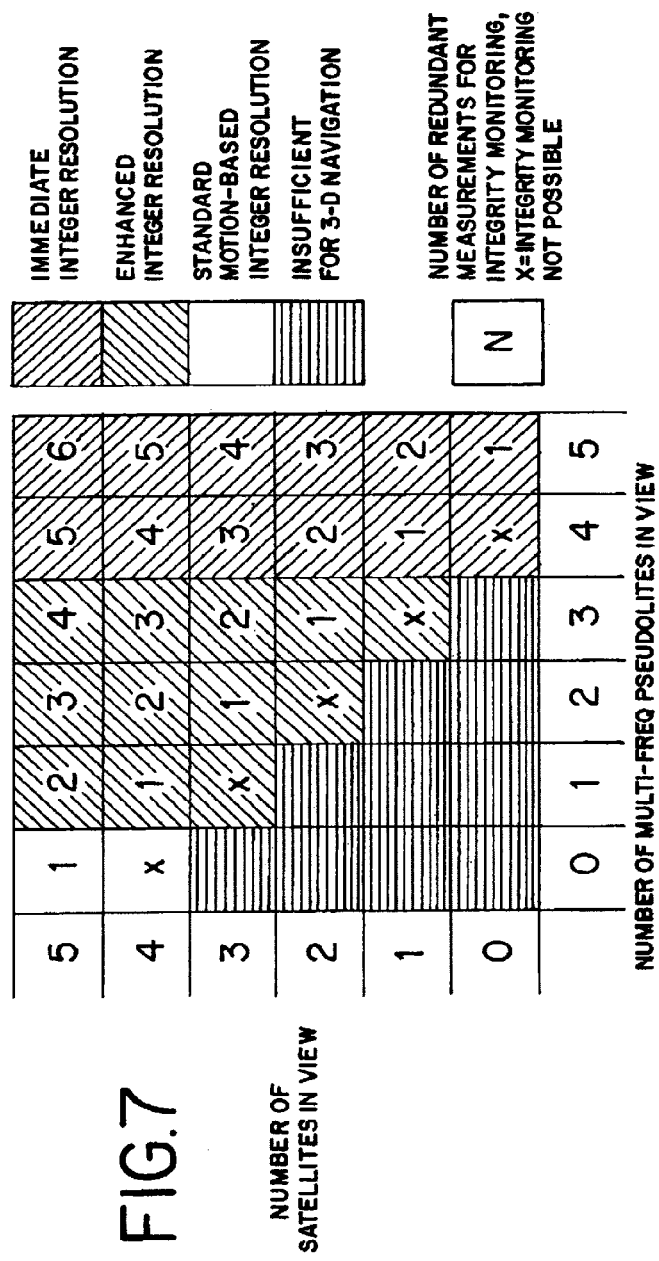
FIG. 7 is a table listing candidate frequency sets for three- and four-Frequency systems incorporating an embodiment of the invention.

FIG. 7 is a table listing candidate frequency sets for three- and four-frequency systems incorporating an embodiment of the invention. For a four-frequency system, two frequencies may be in the 902.0–928.0 MHz ISM band, and two frequencies may be in the 2400.0 MHz–2483.5 MHz ISM band. So as to not disrupt the normal use of any incorporated GNSS (GPS, for example), preferably none of the signal generators operates on any of the GNSS frequencies (L1 (1575.42 MHz) and L2 (1227.60 MHz) for GPS, for example).

A signal generator 210 may include a phase-lock loop (PLL) 211, a filter 212, a microwave VCO 213, a mixer 214, a second filter 215 and a switch 216. These components may be interconnected as illustrated and as described herein.

The PLL 211 of a signal generator 210 may control the frequency produced by that signal generator 210 (the processor 202 controlling the PLL 211). The reference oscillator 203 may drive the PLL 211. The reference oscillator may be a low-cost temperature-controlled crystal oscillator (TCXO). The lower-frequency TCXO may stabilize the microwave-frequency carrier signal through the phase-lock loop feedback circuit 211, 212, 213.

Where the GNSS is GPS, the code generator 204 may generate a gold-code (GPS C/A code) spreading pattern that the mixer 214 mixes with the carrier. Codes other than the GPS C/A codes may be used for the spreading function. Because of the economics that flow from using existing GPS chipsets, however, the GPS C/A codes or the GPS P-codes are the most likely choices for the spreading code.

The code generator 204 may also modulate low-rate data (50 to 1 k baud) on the carrier. The modulated data may include the surveyed location of the pseudolite, the pseudolite 1-*i*'s reference-oscillator offset from GPS time, and the satellite differential phase corrections and ephemeredes. Broadcasting all of this data on the pseudolite's ranging signal (the multiple RF signals) makes a separate differential reference station and subsequent communication link unnecessary. Multiple m separate data channels allows data to be sent in parallel (e.g., one byte can be distributed over four signal channels in two-bit chunks). This permits data rates up to m kbaud. Where m is four, the bandwidth is sufficient to accommodate all of the above data.

The filter 215 filters the mixed carrier, code, and data, and under the control of the pulse generator 205, the switching circuit 216 passes the filtered mix. Pulsing a pseudolite signal at a short duty cycle (say, 5–10%) and a relatively high power (say, 1–10 milliwatts) may provide benefits when a pseudolite transmits on a GNSS frequency. For example, pulsing may enable a pseudolite to operate without significant impact on GNSS satellite signals. Also, pulsing may increase the useful spatial range of the pseudolite signal. Without pulsing, the range-ratio over which the pseudolite can be used is roughly 3:1; with pulsing, the range-ratio is greater than 1000:1.

(Where the multiple signals broadcast by the multi-frequency pseudolite are not on the GNSS frequencies, pulsing may not provide the first benefit—but in this instance, the first benefit is no longer required.)

The combiner 208 may sum the multiple signals from the signal generators 210, and the transmit antenna 207 may then broadcast them. The antenna 207 may be a wide-band antenna or may be separate narrow-band antennae. Whatever the antenna arrangement, coincident phase centers are preferred for all the frequencies involved. Otherwise, the position solution may be more challenging to calculate than presented herein.

A pseudolite 1-*i* may include a multi-frequency reference receiver 2 capable of positioning from multi-frequency pseudolites. First, such a receiver 2 enables the pseudolite 1-*i* to automatically survey its location and then broadcast that information via the data message. Second, the receiver 2 enables the pseudolite 1-*i* to collect satellite differential correction data and ephemeredes (sent via the data message). Third, the receiver 2 provides synchronization for triggering the pulse generator 205. Since the receiver 2 can use other multi-frequency pseudolites 1-*i* to determine its position, the pseudolite 1-*i* may be placed in an area of insufficient satellite coverage yet still be fully operational.

For indoor applications of the invention, the integrated receiver 201 may be omitted by connecting all the pseudolites to a common oscillator. The locations of the pseudolites in an indoor setting are surveyed by means other than GNSS, and the survey data entered—manually, for example—into the pseudolites for re-broadcast to users.

A Multi-frequency Receiver

Figure 5:
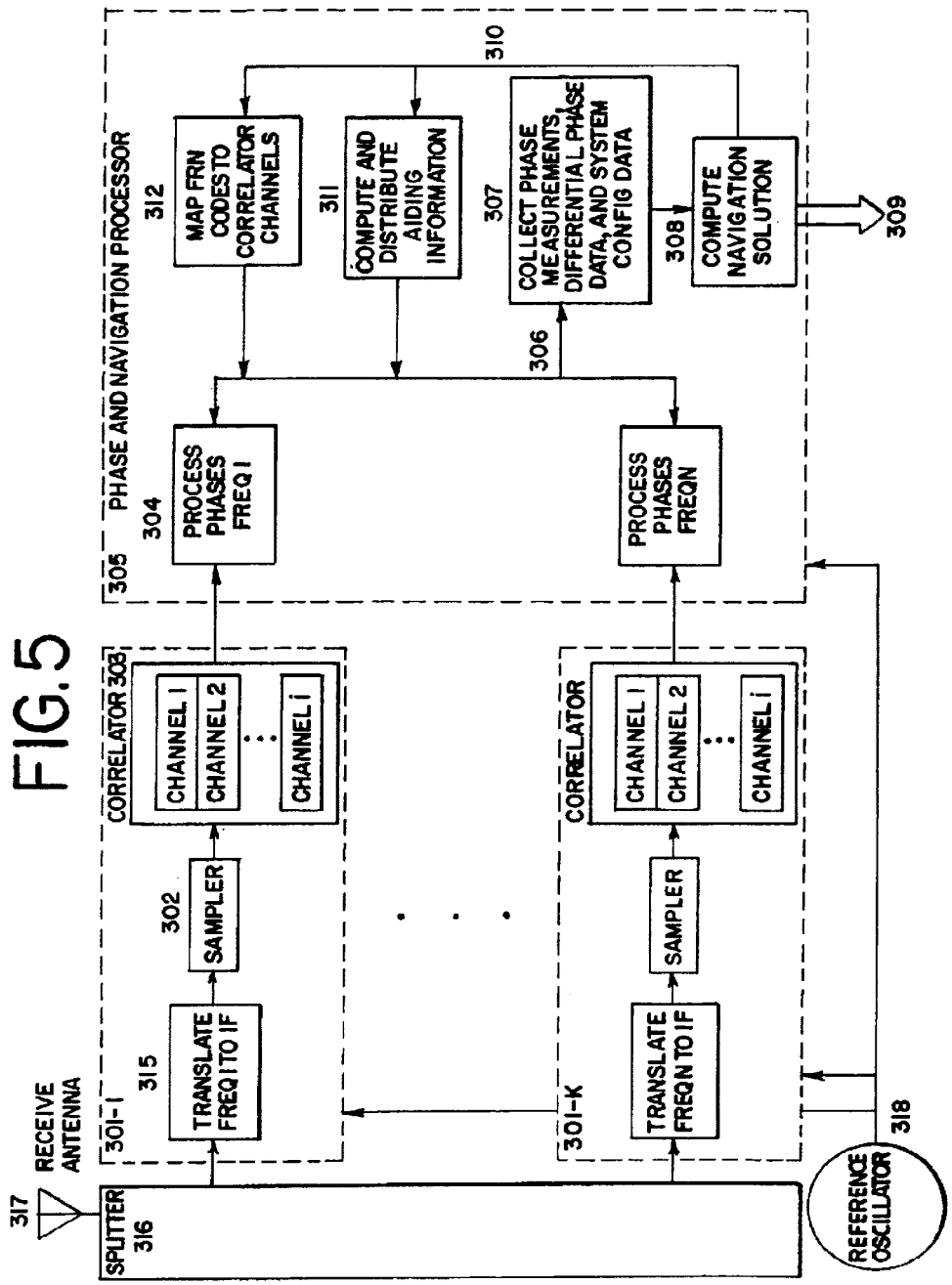
FIG. 5 illustrates a multi-frequency receiver according to one embodiment of the invention.

FIG. 5 illustrates a multi-frequency receiver 2 or 201 according to one embodiment of the invention. The receiver 2 of FIG. 5 is the counterpart to the pseudolite 1-*i* of FIG. 4, and both assume that GPS is the operative GNSS.

It is worth noting here that a multi-frequency receiver in the context of this patent pertains to a receiver capable of interpreting the signals of a multi-frequency pseudolite as described herein. A multi-frequency receiver is different from a "dual-frequency" or "L1/L2" GPS receiver, which is a well-known technology.

The receiver 2 may include a receive antenna 317, a splitter 316, multiple up/down converters 315, respective multiple GNSS receivers 301 and a navigation processor 305. These components may be interconnected as illustrated and as described herein.

A standard L1 GPS receiver with a frequency converter and modified internal software can interpret a non-L1 frequency signal just as if it were broadcast on L1. Thus, a multi-frequency receiver may be built up from a set of such L1 receivers and frequency converters. Such a receiver may include five conventional GPS receivers 301-1:5 under control of the navigation processor 305. Each of four of the receivers 301 may handle a respective one of the four signals transmitted by the pseudolites 1-I. A frequency converter 315 between the antenna 317 and the front end of a GPS receiver 301 may modulate the incoming signal up or down to GPS L1 so the receiver 301 can work with the signal as if it were broadcast on L1. The fifth OPS receiver 301 may directly measure the satellite signals and does not require a frequency converter.

More generally, the multi-frequency receiver 2 may include m+1 conventional GNSS receivers 301 under control of the navigation processor 305. Each one of m of the GNSS receivers 301 handles a respective one of the m signals transmitted by the pseudolites 1-I. The frequency converter 315 modulates the incoming signal up or down to a predetermined standard GNSS frequency so the standard receiver 301 can work with the signal as if it were broadcast on that predetermined standard GNSS frequency.

Like the pseudolite transmit antenna 207, the receiver antenna 317 may be a wide-band antenna or separate narrow-band antennae, in any event with a coincident phase center for all frequencies involved. A low-noise amplifier (LNA, not shown) may amplify the received signal, and the five-way (m+1) splitter may supply a signal to each of the GPS receivers 301.

A GPS receiver 301 may include a RF front-end and sampler 302, correlator channels 303 and a phase processor 304.

The GPS receivers 301 may not process a position solution as a conventional GPS receiver does but may collect phase measurements in the form of code and carrier phases. The RF front-end and sampler 302, correlator channels 303, and phase processor 304 perform this function as is well known in the art. The navigation processor 305 may run a process 307 that collects code and carrier phase measurements 306 from the receivers and sends them to the navigation solution process 308. The receiver 2 outputs the navigation solution.

In processes 311 and 314, the navigation processor 305 may use the navigation solution to command the GPS receivers as to which PRN codes to search for and which Doppler offsets to use in searching for additional satellites and pseudolites.

Additional Embodiments

Figure 2:
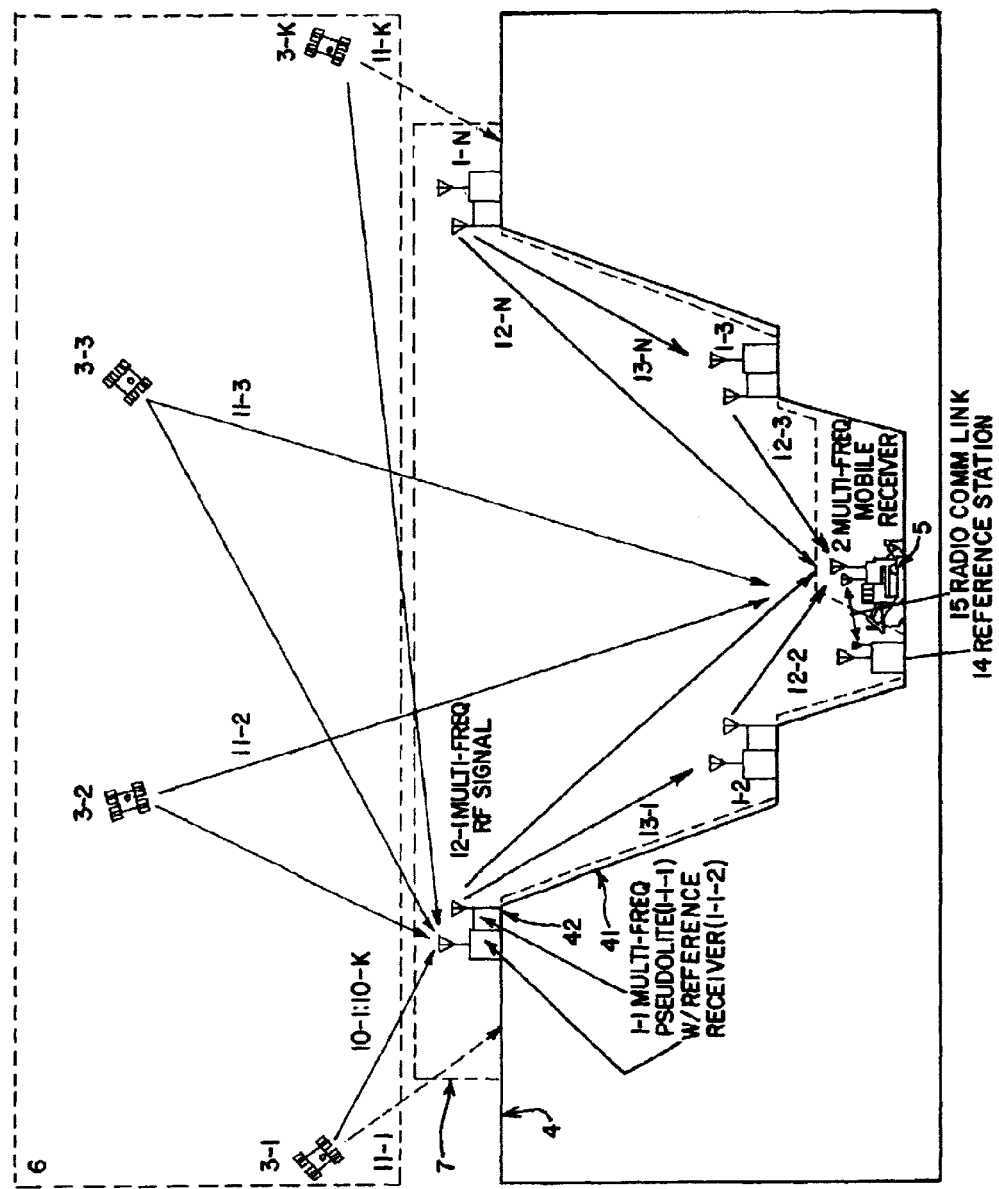
FIG. 2 illustrates an open-pit mine incorporating another embodiment of the invention.

FIG. 2 illustrates an open-pit mine incorporating another embodiment of the invention. The embodiment may include a pit 4, a mining vehicle 5, a global navigation satellite system 6 of the art and a multi-frequency pseudolite system 7, as well as a multi-frequency reference station 14 separate from the multi-frequency pseudolites of the MFPS 7. The reference station 14 includes a reference receiver 2. (This embodiment may prove technically easier to implement in a real application of the invention than that of FIG. 1).

With line-of-sight visibility to all of the same pseudolites and satellites that all of the mobile receivers have available, the reference station 14 may serve the entire work space. The reference receiver 2 may collect differential code and carrier phase information and satellite ephemeredes and distribute these to users' mobile receivers 2 via a radio communications link 13 independent of the pseudolites.

Figure 3:
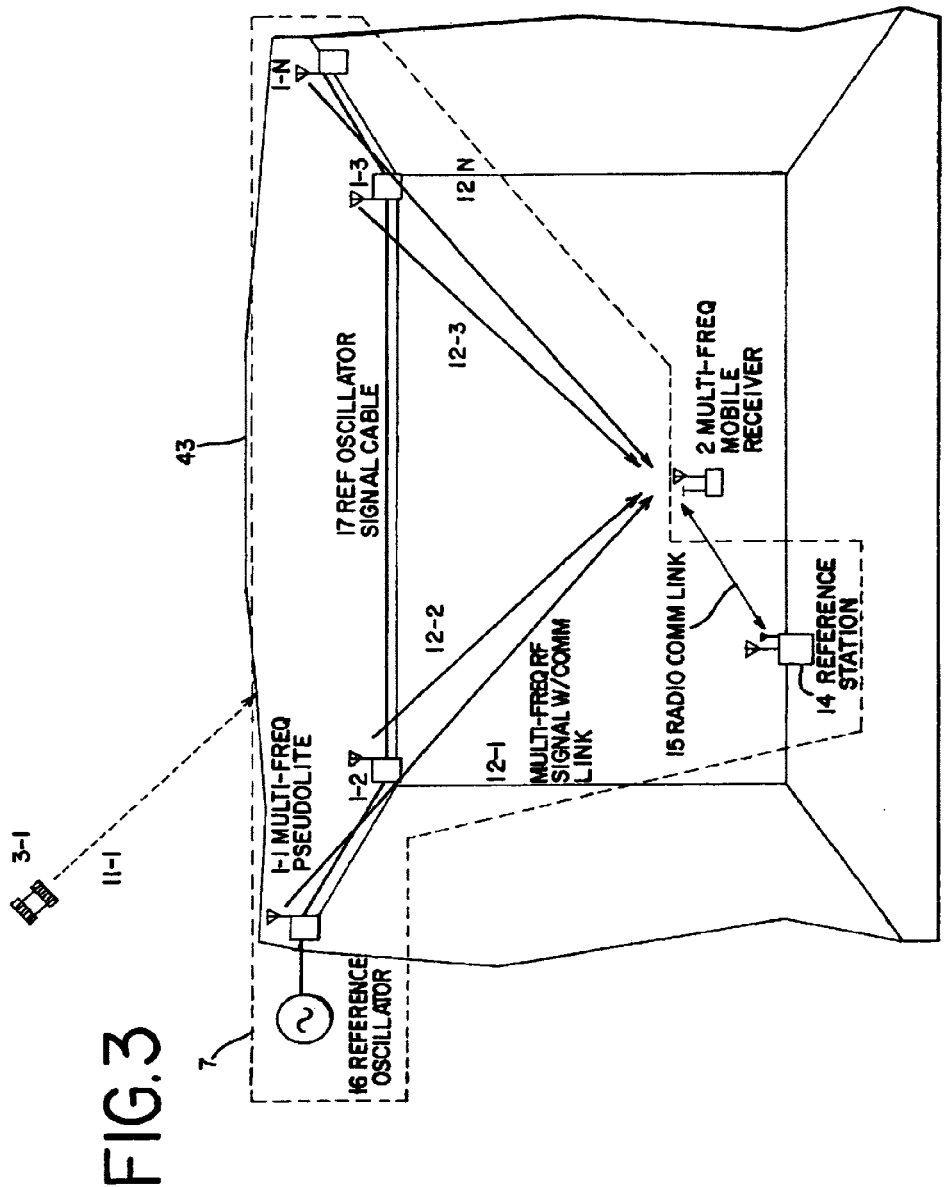
FIG. 3 illustrates an indoor positioning system incorporating an embodiment of the invention.

FIG. 3 illustrates an indoor positioning system incorporating an embodiment of the invention. In this instance, no satellites are visible. An oscillator 15 connected through one or more cables 16 to pseudolites 1-i may synchronize the pseudolites 1-i.

Position Solution Using Multi-frequency Pseudolites and Receivers

A multi-frequency GNSS receiver 2 can calculate its position by measuring the code and carrier phases transmitted by a set 7 of multi-frequency pseudolites 1-i and processing these phase measurements with the algorithms described herein. The position calculation differs from the conventional GNSS position determination. (While any GNSS may be used to illustrate position solving, the following explanation assumes the GPS.)

Existing GPS receiver technology typically provides code-phase measurements with meter-level noise figures and carrier-phase measurements with centimeter-level noise figures. With four or more multi-frequency pseudolites in view and with good geometry, the multi-frequency GPS receiver can employ carrier-phase measurements and immediately achieve centimeter-level position solutions.

In embodiments described above, each pseudolite 1-i includes a reference receiver 2. An included reference receiver 2 can be assumed to be zero range from its respective pseudolite 1-i and to provide a direct measure of the difference between the local oscillator 203 and GPS time. From these assumptions, it follows that all phases between the pseudolite and a user can be considered differentially corrected and the only time bias in the system is between the mobile receiver and GPS time.

The parameters of interest in the position calculations are as follow:

$R_i$ True range between the mobile user and pseudolite i.

$\rho_i$ Precise range derived from phase measurements.

$f_j$ Frequency of carrier signal j, $j \in \{1 \ldots N_f\}$.

$\lambda_j$ Wavelength of carrier signal j, $\lambda_j = c/f_j$, where c is the speed of light.

$\phi_{ij}$ Code phase to pseudolite i for frequency j (differentially corrected).

$\psi_{ij}$ Carrier phase to pseudolite i for frequency j (differentially corrected).

T Range-equivalent of the offset between the mobile-receiver clock and GPS time.

$M_{ij}$ Code-phase cycle ambiguity from pseudolite i to mobile receiver for frequency j.

$N_{ij}$ Carrier-phase cycle ambiguity from pseudolite i to mobile receiver for frequency j.

$N_f$ Number of frequencies implemented in the ranging signal.

$\sigma_{cd}$ Variance of the code phase measurements (assumed same for all carrier frequencies).

$\sigma_j$ Variance of the carrier phase measurements for frequency j.

$w_{cd}$ Code phase noise as zero-mean Gaussian with variance $\sigma_{cd}$.

$w_j$ Carrier phase noise as zero-mean Gaussian with variance $\sigma_j$.

The first step of the positioning algorithm determines the precise ranges between the mobile user and each of the pseudolites. "Precise range" in this instance means that the range accuracy is established to better than one wavelength of the highest frequency employed. The second step extracts the position coordinates from the precise-range measurements. The second step is fairly well understood in the art—employing a non-linear least-squares algorithm, for example—and so only the first step is covered in detail.

The range $R_i$ from the pseudolite to receiver station is related to the code phase measurement $\phi_{ij}$ by equation (1):

$$\Phi_{ij} = R_i + \tau + \lambda_{cd} M_{ij} + W_{cd} \qquad (1)$$

As noted above, for the configuration under consideration, $\Phi_{ij}$ is a differential code phase, and $\tau$ is the offset between the mobile receiver's clock and GPS "true time." $M_{ij}$ is the code cycle ambiguity from the pseudolite i to the mobile receiver for frequency j.

For most applications of the present invention, $M_{ij}$ can safely be assumed to be zero because the scale of the invention will be less than one code phase cycle (300 km) in any dimension. This simplifies the code measurement equation to equation (2):

$$\Phi_{ij} = R_i + \tau + W_{cd} \qquad (2)$$

The carrier-phase measurements are similar in form, but the cycle ambiguities $N_{ij}$ must be resolved. Again, due to the co-location of the reference receiver with the pseudolite, these are differential carrier phases and the time bias is between the mobile receiver and true time:

$$\psi_{ij} = R_i + \tau + \lambda_j N_{ij} + W_j \qquad (3)$$

The time bias, T, is common to all measurements and can be omitted from the equations for the time being. It will be re-introduced after the precise, range is resolved:

$$\phi_{ij} = R_i + w_{cd} \qquad (4)$$

$$\psi_{ij} = R_i + \lambda_j N_{ij} + w_j \qquad (5)$$

Resolving the precise ranges involves superimposing all the probability density functions for the various carrier cycle ambiguities from a given pseudolite, centered around the code phase measurement and enveloped by the code-phase probability density function. The probability density function for a given carrier can be viewed as a comb with spacing between the "teeth" equal to the wavelength of that carrier. By superimposing combs of different spacing (the probability density functions for the various carrier signals), only one set of "teeth" overlap, representing the most probable solution. The width of the comb (and hence the total number of "teeth") is bounded by the probability density function for the code phase measurement.

The starting point for the resolution process is the approximate range provided by the code phases. If there are $N_f$ frequencies involved, then there will be $N_f$ code phase measurements from a given pseudolite. $\phi_{io}$, is the average of the code phases between pseudolite i and the mobile receiver:

$$\phi_{io} = \frac{1}{N_f} \sum_{j=1}^{N_f} \phi_{ij} \qquad (6)$$

Since the raw carrier phase measurements contain an arbitrary cycle ambiguity, this ambiguity is stripped off from the fractional phase and replaced with the closest number of integer wavelengths as provided by the code phase estimate $\Phi_{io}$. The derived quantity is the centered carrier phase $\psi_{cij}$. In the following equation, the modulus operator strips off the integers from the raw carrier phase measurement to leave a fractional phase, and the floor function appends the range of the closest integer to the code phase estimate $\Phi_{io}$:

$$\psi_{cij} = \mathrm{mod}(\psi_{ij}, \lambda_j) + \lambda_j \mathrm{floor}(\Phi_{io}/\lambda_j) \qquad (7)$$

The centered carrier phase $I_{cij}$ serves as the location to center the probability density function for carrier j. After all of the probability density functions are superimposed, the highest probability integer indicates an offset from the original code phase estimate $\phi_{io}$. This offset is applied to the original code phase estimate to achieve the precise range $\rho_i$.

Sampled sequences of the probability density functions for all the carriers can be generated and then multiplied together to determine the highest probable cycle ambiguity solution. The range (length) of the sampled sequence is determined by the code phase variance $\sigma_{cd}$. The sequence is preferably at least 2–3 variances wide. The resolution of the samples is preferably finer than the resolution of the highest frequency carrier phase measurement (typically less than a centimeter). The sampled probability density function for pseudolite i, frequency j is represented as $p_{ijk}$, where k is the sample index and is directly related to the range by k·dr, where dr is the sample resolution. Assuming the carrier phase measurement noise is zero-mean Gaussian with variance $\sigma_j$, the probability density function $p_{ijk}$ is the superposition of independent Gaussian distributions, each with variance $\sigma_j$ and separation between centers of one carrier wavelength $\lambda_j$. Additionally, the entire distribution is shifted by the difference between the centered carrier phase, $I_{cij}$, and the code phase estimate $\phi_{io}$. $p_{ijk}$ can be represented mathematically as equation (8):

$$p_{ijk} = \sum_n e^{\frac{(k \cdot dr - \lambda_j \cdot n + \psi_{cij} - \phi_{io})^2}{2\sigma_j^2}} \qquad (8)$$

Superimposing the probability density functions for all of the carriers j for a given pseudolite i, and enveloping the code probability density function results in the probability density product sequence, $P_{ik}$.

$P_{ik}$ is characterized by a unique maximum value or spike that indicates the location in the sequence of the correct integer solution. $P_{ik}$ is formed by multiplying the code probability density sequence and the $p_{ijk}$ sequences together:

$$P_{ik} = e^{\frac{(k \cdot dr)^2}{2\sigma_{cd}^2}} \sum_{j=1}^{N_f} p_{ijk} \qquad (9)$$

By finding the index, m, of the maximum value of $P_{ik}$, the offset between the code phase estimate and the precise range is determined to be m·dr. The precise range is thus computed as in equation 10:

$$\rho_i = \phi_{io} - m \cdot dr \qquad (10)$$

The precise ranges between all pseudolites and the mobile receiver can be found in this manner. It should be noted that the precise range established here is actually the precise range plus the time bias that was omitted early in the derivation. The procedure for extracting the position solution and the time bias from a set of precise range measurements such as these is well known in the art.

For universal application of the invention, preferably at least five pseudolites are in view at all times. This arrangement provides the highest performance available from the system. It is useful to know, however, the expected performance when fewer than five pseudolites are in view.

Figure 6:
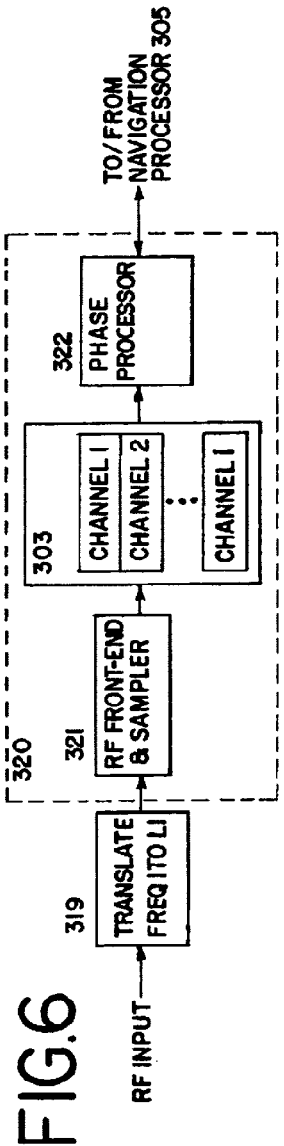
FIG. 6 shows a performance matrix for all combinations of satellites and pseudolites.

FIG. 6 shows a performance matrix for all combinations of satellites and pseudolites. When at least five pseudolites are in view, the user receiver can expect instantaneous integer acquisition, full integrity, and the highest level of accuracy. If four pseudolites and at least one satellite are in view, the system has similar performance—except that the integrity is not guaranteed without resorting to motion-based algorithms to independently resolve the cycle ambiguities for the satellites. These algorithms may take 10 to 20 minutes.

The need for integrity is highest when the navigation sensor is used in feedback control of safety-critical machinery. For existing man-in-the-loop operations this is not a firm requirement, but it can serve to improve the safety of these operations nonetheless. Full integrity monitoring does provide the means for achieving higher levels of automation in many systems. Situations in which there are fewer than four pseudolites but at least five ranging sources in total can achieve full accuracy and integrity, but resort to satellite motion to resolve cycle ambiguities.

The expected performance of any set of frequencies to uniquely discern the correct integers can be determined by computing the probability of a cycle ambiguity occurring over the range of the code phase accuracy. An example of a candidate frequency set for each of a three-frequency and a four-frequency architecture are listed in FIG. 7. The table lists a fourth band designated for ISM in the 5725–5875 MHz range which remains as an option if the other bands are overcrowded by other radio equipment in the area of the application.

Figure 8:
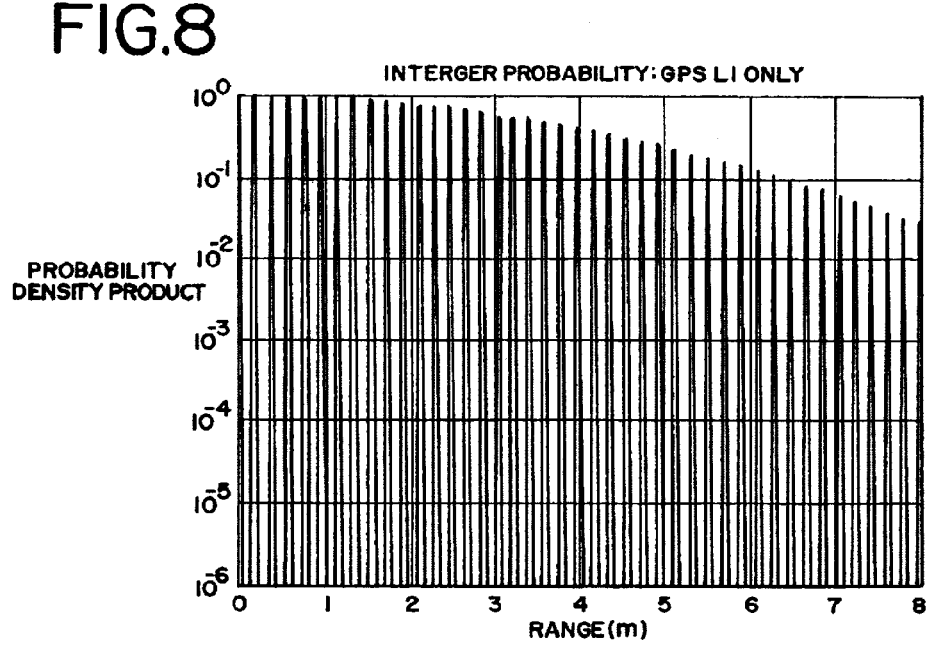
FIG. 8 shows the cycle ambiguity probability for a single-frequency system as a nominal case.

The ability to reject erroneous integer cycle solutions using these frequency sets can be compared with the conventional GPS widelane technique by observing the graphs of the cycle ambiguity probability versus range. The cycle ambiguity probability for a single-frequency system is shown in FIG. 8 as a nominal case.

This semi-logarithmic graph shows that carrier phase alone does not distinguish between being at range 0 as opposed to range 0.19 m, 0.38 m, 0.57 m, etc. Each spike (except for the one at zero) is a potentially wrong selection for the carrier cycle resolution algorithm. The only discernment of range comes from the code phase probability envelope, which in this case is modeled conservatively as a normal distribution with a standard deviation of 3 m. The width of each spike represents the carrier phase noise, modeled here as a normal distribution with a standard deviation of 4% of a carrier cycle, or 0.75 cm for L1. The ability to suppress cycle ambiguities in a multi-frequency system is a function of code and carrier phase noises, as well as the frequencies themselves.

Figure 9:
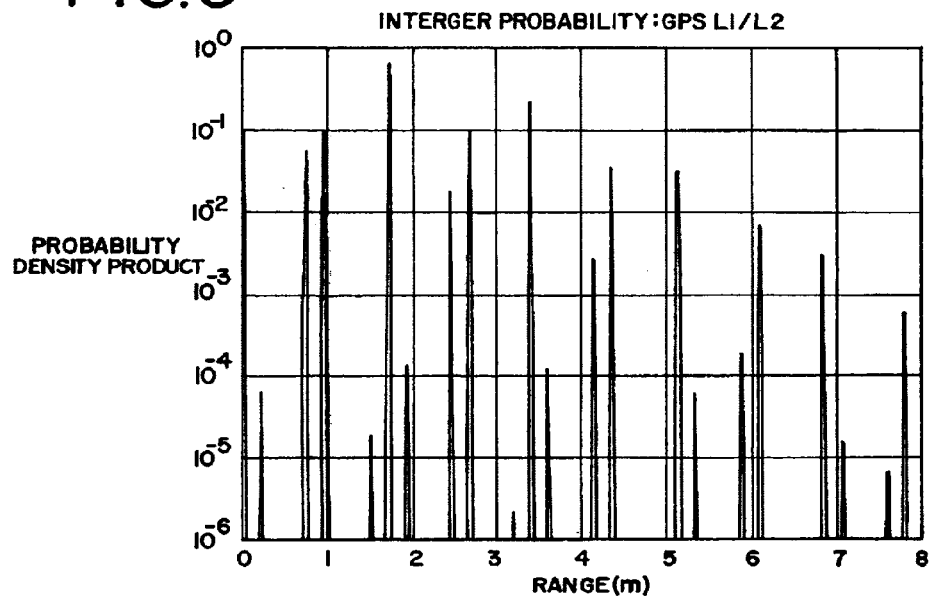
FIG. 9 shows some benefits of the dual-frequency (or widelaning) GPS receiver.

FIG. 9 shows some benefits of the dual-frequency (or widelaning) GPS receiver. The superimposed cycle ambiguity probability functions of L1 and L2 reduce the possible integer solutions substantially, but not enough to completely obviate the need for satellite motion to discern the correct cycle. This is therefore still not adequate for a high-integrity motionless solution.

Figure 10:
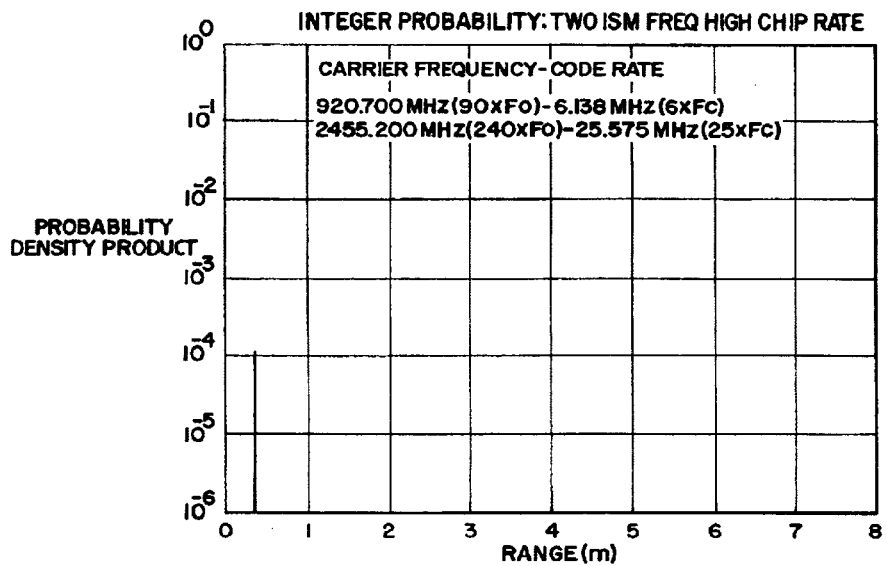
FIGS. 10 and 11 show that even with no motion in the system, the three and four-frequency designs can reduce the probability of selecting an incorrect cycle ambiguity.
Figure 11:
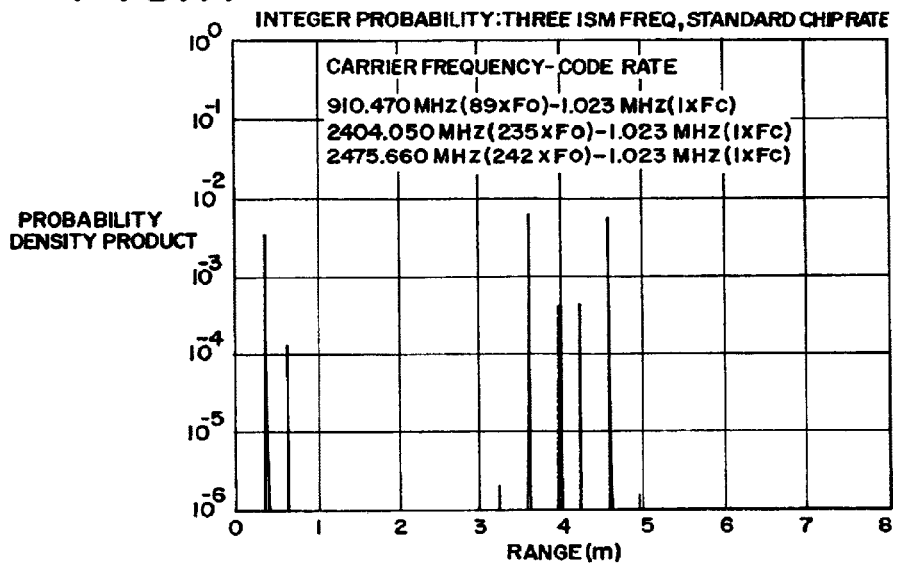

Even with no motion in the system, the three and four-frequency designs can reduce the probability of selecting an incorrect cycle ambiguity to less than 1 in 10 and 1 in 500, respectively, as shown in FIGS. 10 and 11. This substantial improvement over the dual-frequency system provides the ability to resolve position to better than 10 cm in one measurement period. The 1 in 10 possibility for a cycle ambiguity error in the three-frequency system is deemed marginal performance, although it is worth noting that redundancy provided by five or more signal sources (i.e. any combination of satellites and pseudolites) establishes the ultimate integrity of the navigation solution. Integrity monitoring via redundant measurements readily discerns the 1 in 500 event of an incorrect cycle ambiguity in the four-frequency case.

The present invention combines and extends the pseudolite technique with the dual frequency satellite technique to create apparatus and methods for rapid integer ambiguity resolution. The invention further enhances the integrity and speed of the technique by increasing the number of coherent signal sources to three, four or even more frequencies. The invention uses multi-frequency pseudolites to accelerate and facilitate the resolution of integer wavelength ambiguities in carrier-based differential GPS applications. Consequently, integer ambiguities can be determined extremely quickly and without any residual uncertainty as to the accuracy or fidelity of the wavelength ambiguity determination. This eliminates augmenting the resolution process with other techniques requiring satellite or vehicle motion. (Satellite motion takes time to produce a useful geometry change, while vehicle motion may not be useful or practicable in applications using slow or ponderous equipment.)

In one embodiment, the invention is a multi-frequency pseudolite that provides the signal-in-space needed by a receiver to determine the cycle ambiguity of the microwave carrier frequencies. The cycle ambiguity is determined with very high and quantifiable accuracy and integrity.

In another embodiment, the invention is a microwave-frequency receiver that leverages a multi-frequency pseudolite signal, as well as standard GPS satellite signals, to rapidly determine its position to the accuracy typical of carrier-phase differential GPS techniques.

In another embodiment, the invention leverages conventional GPS equipment, including GPS receivers and pseudolites, to reduce the cost of the overall system.

Indeed, the invention now being fully described, many changes and modifications that can be made thereto without departing from the spirit or scope of the appended claims will be apparent to one of ordinary skill in the art.

What is claimed is:

1. A positioning system comprising:
    a plurality of pseudolite transmitters, each pseudolite transmitter capable of transmitting a plurality of GNSS-like radio-frequency (RF) signals, each signal including a carrier signal and a spreading code modulating said carrier signal; and
    a receiver system, the receiver system capable of:
        a) receiving said plurality of GNSS-like radio-frequency (RF) signals;
        b) determining a plurality of measurements including:
            a carrier phase measurement of each said carrier signal; and
            a code phase measurement of each said spreading code; and
        c) calculating a range between at least one of the plurality of pseudolite transmitters and the receiver system from said carrier phase and code phase measurements where the range is accurate to within one wave length of a highest frequency of the carrier signal in the absence of relative motion between the pseudolite transmitters and the receiver system;
        wherein the plurality of GNSS-like radio-frequency (RF) signals includes signals whose frequencies fall within at least two different continuous ISM bands.

2. The positioning system of claim 1 wherein the receiver system is operable to determine the range in a single measurement cycle.

3. The positioning system of claim 1 wherein said receiver system comprises multiple conventional GNSS receivers.

* * * * *